United States Patent [19]
Clark et al.

[11] Patent Number: 5,802,031
[45] Date of Patent: Sep. 1, 1998

[54] PROGRAMMABLE PPM/PWM WRITING SYSTEM FOR OPTICAL DISK

[75] Inventors: Alan Robert Clark; Robert Allen Hutchins, both of Tucson, Ariz.

[73] Assignee: International Business Machines Corporation, New York, N.Y.

[21] Appl. No.: 972,467

[22] Filed: Nov. 18, 1997

Related U.S. Application Data

[63] Continuation of Ser. No. 791,149, Jan. 28, 1997, abandoned.

[51] Int. Cl.$^6$ .................................................. G11B 7/00
[52] U.S. Cl. ............................ 369/59; 369/124; 369/116
[58] Field of Search .............................. 369/116, 54, 58, 369/59, 44.32, 112, 120, 124, 47

[56] References Cited

U.S. PATENT DOCUMENTS

| | | | |
|---|---|---|---|
| 4,821,253 | 4/1989 | Usui et al. | 369/59 |
| 5,130,970 | 7/1992 | Ohta | 369/100 |
| 5,321,682 | 6/1994 | Spruit et al. | 369/116 |
| 5,327,411 | 7/1994 | Iwasa et al. | 369/59 |
| 5,327,414 | 7/1994 | Makino et al. | 369/116 |
| 5,400,313 | 3/1995 | Belser et al. | 369/116 |
| 5,487,059 | 1/1996 | Saito et al. | 369/116 |
| 5,490,126 | 2/1996 | Furumiya et al. | 369/59 |
| 5,526,333 | 6/1996 | Usui et al. | 369/50 |
| 5,530,688 | 6/1996 | Hurst, Jr. et al. | 369/116 |
| 5,561,656 | 10/1996 | Hurst, Jr. | 369/124 |
| 5,617,401 | 4/1997 | Hurst, Jr. | 369/116 |
| 5,631,887 | 5/1997 | Hurst, Jr. | 369/58 |
| 5,640,381 | 6/1997 | Call et al. | 369/116 |
| 5,732,055 | 3/1998 | Masaki et al. | 369/54 |

FOREIGN PATENT DOCUMENTS

| | | | |
|---|---|---|---|
| 1-155522 | 6/1989 | Japan | 369/54 |

*Primary Examiner*—Nabil Hindi
*Attorney, Agent, or Firm*—John H. Holcombe; Robert M. Sullivan

[57] ABSTRACT

A programmable writing system for an optical disk drive which is adaptable for pulse position modulation (PPM) and pulse width modulation (PWM) pulse generation. The writing circuit is responsive to a PPM/PWM mode command for generating programmed laser pulse signals. Specifically, a pattern detector is responsive to the PPM/PWM mode command for detecting input data. The detected data is provided to a pulse selector for selecting programmed pulse power and/or duration values, which operate a pulse generator to set pulse power levels and/or to set the duration of the generated laser pulse signals. In PWM mode, the pattern detector provides a toggle signal with each detected signal and the pulse selector responds to the toggle signal to alternate between providing mark pulse power and/or duration values and providing space duration values to thereby provide alternating mark and space signals.

9 Claims, 7 Drawing Sheets

PROGRAMMABLE PPM/PWM WRITING SYSTEM FOR OPTICAL DISK

The application is a continuation of application Ser. No. 08/791,149, filed Jan. 28, 1997 now abandoned.

DOCUMENTS INCORPORATED BY REFERENCE

Commonly assigned U.S. Pat. No. 5,400,313 is incorporated for its showing of an optical data storage system which stores data using different laser power levels or durations.

Commonly assigned U.S. Pat. No. 5,561,656 is incorporated for its showing of an optical data storage system which stores data marks using different laser power levels and durations, and data spaces using preheat laser power pulse levels and different durations.

TECHNICAL FIELD

This invention relates to optical data storage and more particularly to a writing system for writing optical storage pulse position modulation and/or pulse width modulation data.

BACKGROUND OF THE INVENTION

Optical disk drives provide for the storage of large quantities of data on optical disks. The data is stored by focusing a laser beam onto a spot of the data layer of the disk to heat the layer. The data is read by focusing a laser beam onto the data layer of the disk and then detecting the reflected light beam.

In magneto-optical recording, the laser heats the spot above its Curie temperature while the magnetic domain of the spot is oriented in either an up or a down direction by an external magnetic field. The data is read by directing a low power laser spot to the data layer. The differences in magnetization direction of the spots cause the plane of polarization of the reflected light beam to be rotated either clockwise or counterclockwise. This change in orientation of polarization of the reflected light is then detected.

In phase-change recording, the laser heats the spot to cause a structural change of the data layer, typically from a crystalline phase to an amorphous phase. The data is detected as changes in reflectivity between the two phases.

Pulse position modulation (PPM) and pulse width modulation (PWM) are two primary ways to record data on optical storage media. PPM records data as the distance between the centers of the marks on the medium. PWM records information as the distance between the transitions of the marks. A transition is either the beginning (leading) or ending (trailing) edge of a mark. In PWM, the characters alternate between the pulse length and the space length. Thus, PPM pulses are all substantially identical and contain the information by means of the length of the spaces between the pulses only, and PWM pulses contain the information by means of the pulse length and the length of the spaces between the pulses.

The predominant recording technique today is PPM because of its simplicity and ease of use. PWM is preferred for high capacity recording because of its capability for storing more information in the same amount of space on the medium. In other words, the effective data storage density can be greatly increased by using PWM recording.

However, PWM recording is more difficult to implement because the transition edges must be precisely positioned and written with sharp boundaries to ensure accurate recording. In PWM, a mark can be an individual spot (also called a submark) or a series of overlapping or contiguous submarks. The thermal buildup that occurs within the data layer during the laser writing process can cause great distortions in the precise placement of the trailing edges. Thermal buildup occurs when there is insufficient time between the writing of successive submarks in a mark to allow the data layer to cool prior to the writing of the trailing edge submark or the writing of the next mark. In addition to the problem of thermal buildup is that the gap may be so long that there is excessive cooling of the data layer so that the data layer does not reach the required temperature at the precise time to write the submark forming the leading edge of the next mark. The effect of thermal buildup and excessive cooling causes errors in the placement of the leading edges of the next mark. In addition, each type of optical media has its own thermal characteristics so the problems of thermal buildup and cooling will vary depending on the type of media being used.

The U.S. Pat. No. 5,400,313 patent addresses the issue of thermal buildup with PWM by recording filler marks between leading or trailing edge marks at selectively reduced power levels based on the amount of overlap between the submarks. The reduced power level continues the PWM marks, but with a more even thermal characteristic and without excessive thermal buildup. Alternatively, the duty cycle of the submarks may be varied to vary the size of the spots and reduce the thermal buildup.

The U.S. Pat. No. 5,561,656 patent addresses the issue of excessive cooling in the gaps by preheating the data layer by a series of pulses at a power level below that which would write a submark on the disk. Both the number and duty cycle of the preheat pulses in the gap is varied depending not only on the length of the gap run length but also the length of the preceding mark run length. In addition, the duty cycle of the various edge and filler submarks may be varied.

The need for precise control over optical pulse edges and/or power has long been recognized by those skilled in the art. U.S. Pat. No. 5,526,333 shows a high speed clock in a phase-locked loop for controlling the duration of the writing laser pulse derived from EFM signals. U.S. Pat. No. 5,490,126 controls the laser pulse widths using analog delay lines. U.S. Pat. No. 5,327,414 shows a ROM for providing the signal to control the pulse length. U.S. Pat. No. 5,327,411 shows a pulse forming circuit controlling the pulse lengths. U.S. Pat. No. 5,130,970 shows adjusting the amplitude and duty cycle of standard pulses.

A problem is the desire to use various media and various types of recording (PPM, PWM, etc.) in the same drive. But the various media and various types of recording require different pulse modulation characteristics. The prior art would require separate sets of circuitry for each media and for each type of recording.

SUMMARY OF THE INVENTION

Disclosed is a programmable writing system for an optical disk drive which can be adapted for various types of media or for various types of recording, primarily pulse position modulation (PPM) and pulse width modulation (PWM) pulse generation. The writing circuit is responsive to a PPM/PWM mode command for generating programmed laser pulse signals. Specifically, a pattern detector is responsive to the PPM/PWM mode command for detecting input data. The detected data is provided to a pulse selector for selecting programmed pulse power and/or duration values, which operate a pulse generator to set pulse power levels and/or to set the duration of the generated laser pulse signals. In PWM mode, the pattern detector provides a toggle signal with each detected data signal and the pulse selector responds to the toggle signal to alternate between providing mark pulse power and/or duration values and providing space duration values to thereby provide alternating mark and space signals.

For a fuller understanding of the present invention, reference should be made to the following detailed description taken in conjunction with the accompanying drawings.

DETAILED DESCRIPTION OF THE INVENTION

Figure 1:
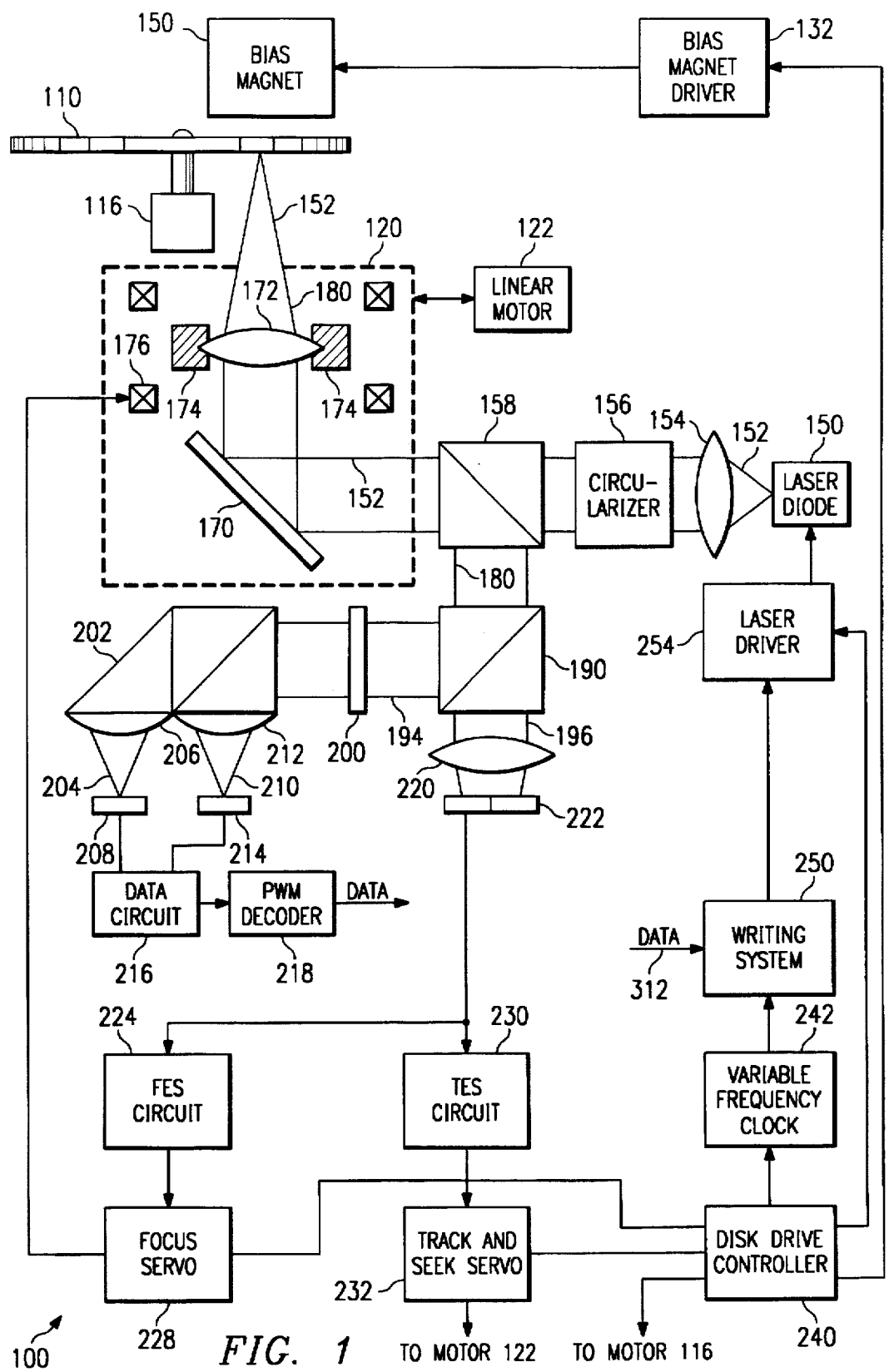
FIG. 1 is a schematic diagram of an optical data storage system.

Referring to FIG. 1, an exemplary optical data storage system 100 is illustrated, having a writable optical disk 110, which may be any suitable type, including phase change or magneto-optical. The disk 110 may be removable and is mounted for rotation by spindle motor 116. An optical head 120 is positioned adjacent to the disk 110. Head 120 is moved in a radial direction relative to disk 110 by a linear motor 122. In the event a magneto-optical disk 110 is employed, a bias magnet 130 is employed on the opposite side of the disk from the head 120 and is connected to a bias magnet driver 132.

A laser diode 150 produces a polarized light beam 152. Any conventional optical disk laser may be used, and is typically a gallium-aluminum-arsenide laser diode which generates a light beam 152 at approximately 780 nm in wavelength. Light beam 152 is collimated by a lens 154 and circularized by a circularizer 156. Circularizer 156 is typically a prism.

Beam 152 passes through a beamsplitter 158 to a mirror 170. Mirror 170 reflects the light toward a focussing lens 172, which focusses beam 152 onto the disk 110. Lens 172 is mounted in a lens holder 174, which may be moved relative to disk 110 by a focussing actuator motor 176. Mirror 170, lens 172, holder 174 and motor 176 are preferably located in the optical head 120.

A light beam is reflected from the disk 110, passes through lens 172 and is reflected by mirror 170. A portion of light beam 180 is then reflected by beamsplitter 158 to a beamsplitter 190. Beamsplitter 190 divides the beam 180 into a data beam 194 and a servo beam 196.

Data beam 194 passes through a half waveplate 200 to a polarizing beamsplitter 202. Beamsplitter 202 divides beam 194 into orthogonal polarization components. A first polarization component beam 204 is focussed by a lens 206 to a data detector 208. A second polarization component 210 is focussed by a lens 212 to a data optical detector 214. A data circuit 216 is connected to detectors 208 and 214, and generates a data signal representative of the pattern of transitions recorded on disk 110. Data circuit 216 is connected to a decoder 218 which converts the modulated signal to a digital data signal.

Servo beam 196 is focussed by a lens 220 onto a segmented optical detector 222, such as a typical spot size measuring detector. A focus error circuit 224 is connected to detector 222. A focus servo 228 is of a conventional type and is connected to focus error signal (FES) circuit 224 and motor 176. Servo 228 controls motor 176 to adjust the position of lens 172 as appropriate in order to maintain proper focus. A tracking error signal circuit 230 is connected to detector 222. A track and seek servo 232, as is known in the art, is connected to tracking error signal (TES) circuit 230 and motor 122. Servo 232 causes motor 122 to adjust the position of head 120 as appropriate.

A disk drive controller 240, as is known in the art, is connected to and provides overall control for servo 228 and 232, spindle motor 116, magnet driver 132, and a conventional variable frequency clock 242. Controller 240 adjusts the clocking speed of the clock 242 as appropriate depending upon the position of the head 120.

Clock 242 is connected to writing system 250 in accordance with the present invention. Writing system 250 is connected to a laser driver 254 to cause the laser 150 to write the desired patterns.

The desired patterns with pulse position modulation (PPM) use single write, or "mark", pulses at selected distances apart.

Pulse width modulation (PWM) recording uses the distance between transitions of recorded runs to encode the data.

There are many different encoding schemes known in the art which may be used to encode the data in either PPM or PWM. The most popular type of encoding schemes use run length limited (RLL) codes. These RLL codes use a limited set of run lengths, which when used in different combinations encode any pattern of digital data. A run length is defined as the distance between marks in PPM and in PWM as the distance between the leading edge of a mark and the trailing edge and the distance between a trailing edge of a mark and the leading edge of the next mark.

RLL codes are defined in units of time T. In disk drive systems, this time period T corresponds to an amount of linear distance the disk rotates in the time period T. The RLL codes are designated in the form (d−1, k−1), where d is the minimum run length (in time periods T) and k is the maximum run length (in time periods T). For example, a (2,7) code has a minimum run length of 3T. There are three time periods between the first mark (PPM) or edge (PWM) and the next mark (PPM) or edge (PWM). The maximum run length for a (2,7) code is 8T.

The distance between marks or edges of the run lengths is determined by the formula L=(V*T*t)+W, where L is the distance between the marks or edges, V is the media velocity, T is the number of channel code bit clock periods, t is the time of a channel code bit clock period and W is the diameter of the standard size circular written mark made by the laser on the media.

As described in the incorporated '313 patent, the PWM mark runs are recorded on the disk as a single isolated mark or as a series of contiguous or overlapping circular marks. The first mark in a run is referred to as a leading edge mark and the last mark in a run is referred to as a trailing edge mark. If a run consists of only the leading and trailing marks, and the two marks overlap by one half of the mark diameter or more, one of the marks is written with a laser beam at a reduced power level. If a run consists of three or more marks, then the space between the leading and trailing edge marks is filled with one or more filler marks. If one of the filler marks overlaps one of the other marks by one half of the mark diameter or more, one of the two overlapping marks is written with a laser beam at a reduced power level. Alternatively, the overlapping filler mark in a run of three or more marks, may be replaced with a smaller diameter filler mark which is contiguous with but does not overlap the surrounding marks. This smaller diameter filler mark is written at a greatly reduced laser power level and has its center point shifted slightly away from the preceding mark. The reduced laser power levels results in a great reduction in the thermal buildup in the medium.

Figure 2:
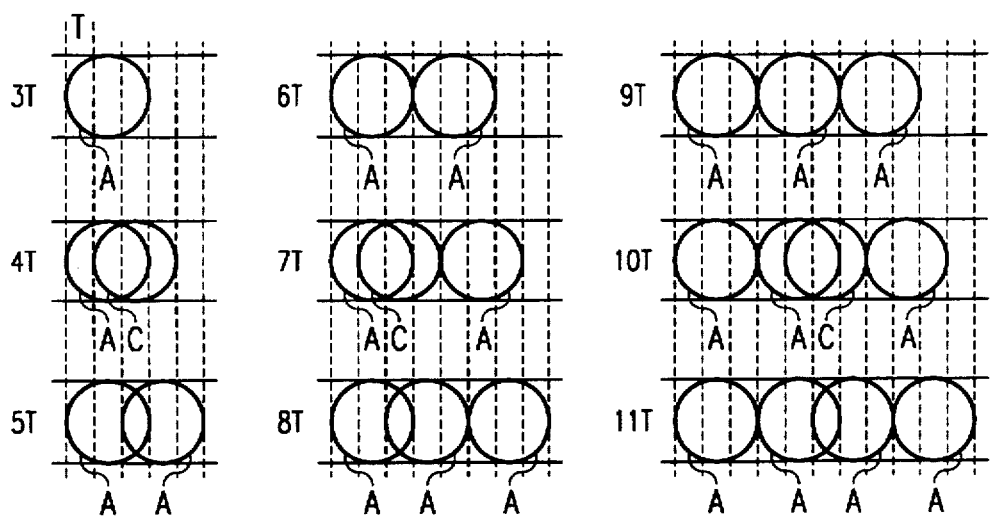
FIG. 2 is a diagram of a set of recording patterns.

FIG. 2 illustrates an example of a pulse width modulation "mark" recording pattern which implements a (2,10) RLL code. The code consists of a set of run lengths of 3T to 11T. All of these run length marks are formed by either an isolated mark of connecting marks which are contiguous or overlapping circular marks. As used herein, contiguous refers to marks which touch but do not overlap. The marks are made by a highly pulsed laser beam at one of two power levels, A or C, where A>C. The bracketing lines represent the orientation of the data tracks.

The minimum run length of 3T is comprised of a single isolated or non-connecting circular mark formed by a highly pulsed laser beam at power level A. The 4T run is comprised of a first circular mark formed at power level A and a second circular mark formed at power level C which overlaps the first mark by two thirds of a circular mark diameter. The 5T run is comprised of a first circular mark at power level A and a second circular mark at power level A which overlaps the first mark by one third of a mark diameter. The 6T run is comprised of two contiguous marks formed at power level A. The 7T run is comprised of a first mark at power level A, a second mark formed at power level C which overlaps the first mark by two thirds of a mark diameter, and a third mark formed at power level A which is contiguous with the second mark. The 8T run is comprised of a first mark at power level A, a second mark at power level A which overlaps the first mark by one third of a mark diameter, and a third mark at power level A which is contiguous with the second mark. The 9T run is comprised of three contiguous marks formed at power level A. The 10T run is comprised of a first mark at power level A, a second contiguous mark formed at power level A, a third mark formed at power level C which overlaps the second mark by two thirds of a beam diameter, and a fourth mark formed at power level A which is contiguous with the third mark. The 11T run is formed of a first mark at power level A, a second mark at formed at power level A contiguous with the first mark, a third mark formed at power level A which overlaps the second mark by one third of a mark diameter, and a fourth mark formed at power level A which is contiguous with the third mark. It can be seen that the entire set of run lengths is based on combining the 3T, 4T, and 5T run lengths. The 6T, 9T, etc., run lengths are made by adding together contiguous 3T marks. The 7T, 10T, etc., runs are made by combining the 4T run with a number of 3T marks. The 8T, 11T, etc., runs are made by combining the 5T mark with number of 3T marks.

In the preferred arrangement, a (2,7) RLL code is used. In this case only the 3T–8T run lengths are needed. However, it can be seen that the arrangement can be used with any number of (2,N) RLL codes.

This recording pattern reduces the thermal buildup in the medium to a minimum and it insures that the leading and trailing edges of the run will be accurately positioned. The pattern uses the absolute minimum number of circular marks to write the desired run lengths. Where the marks must overlap by one half a diameter or more, the second mark is written at a reduced power level. Where there are three or more marks, and an overlap must occur, the overlap does not occur on the trailing edge circular mark. This helps insure that the trailing edge, which is most susceptible to the thermal heat buildup, will be accurately positioned.

Figure 3:
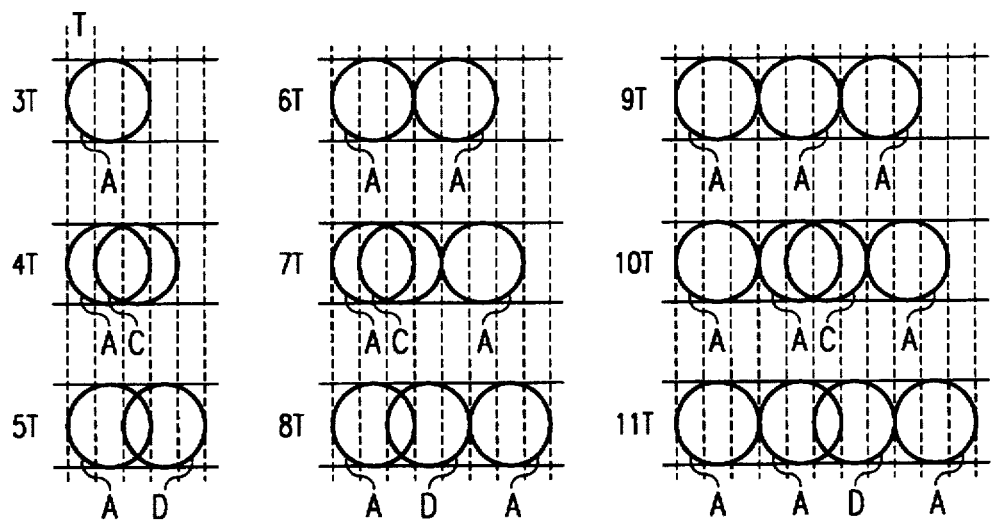
FIG. 3 is a diagram of a set of recording patterns.

FIG. 3 is a diagram of an alternative recording pattern which implements a RLL code and uses three different power levels A, C and D, to record the marks rather than the two power levels of FIG. 2. Power level A is greater than power level D which is greater than power level C. Where marks overlap by more than one half of a diameter, power level C is used on the second mark. Where the marks overlap by less than one half of a diameter, power level D is used on the second mark.

Figure 4:
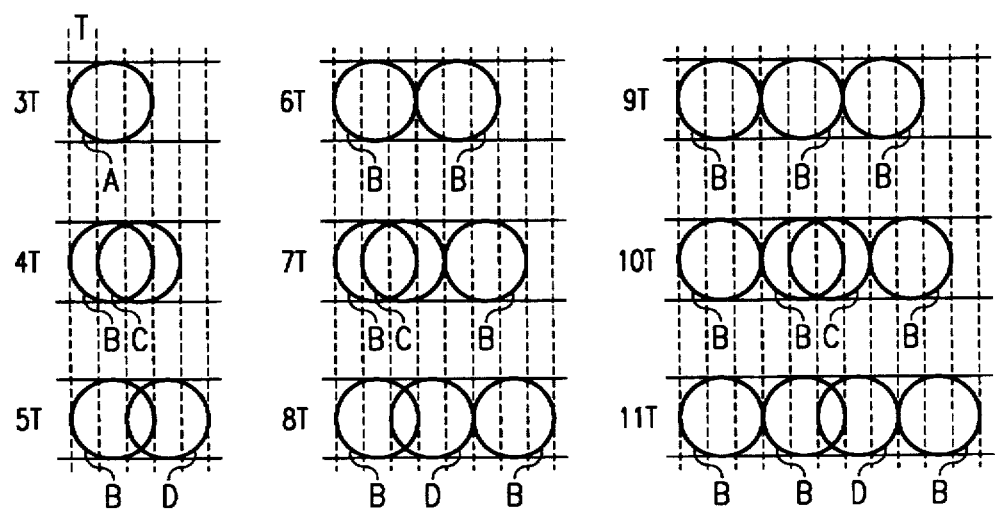
FIG. 4 is a diagram of a set of recording patterns.

FIG. 4 is a diagram of the recording pattern which implements a RLL code and now four power levels are used A, B, C, and D, where the power level A is greater than the power level B, which is greater than the power level D, which is greater than the power level C. In this pattern the maximum power level A is reserved for the single isolated 3T mark.

PPM recording or the gap run lengths of PWM recording comprise the spaces or gaps between successive marks or mark run lengths. The opposite of thermal buildup of heat in the marks, is the cooling of the medium between marks in the PPM or PWM gaps.

As described in the incorporated '656 patent, during the intervening gaps between marks, the medium is preheated by a pulse or series of pulses at a power level below that which would write a submark on the disk. Both the number and duty cycle of these preheat pulses is varied depending on the length of the gap run length to insure that the initial mark at the end of the gap is substantially the same size, regardless of the length of the preceding gap run length. This is especially important for PWM to ensure proper placement of the mark leading edges. When even finer control of the preheating is required, pattern-dependent gap preheat pulsing can be performed, wherein the number and duty cycle of the preheat pulses in the gap is varied depending not only on the length of the gap run length, but also the length of the preceding mark run length.

Figures 5A, 5B:
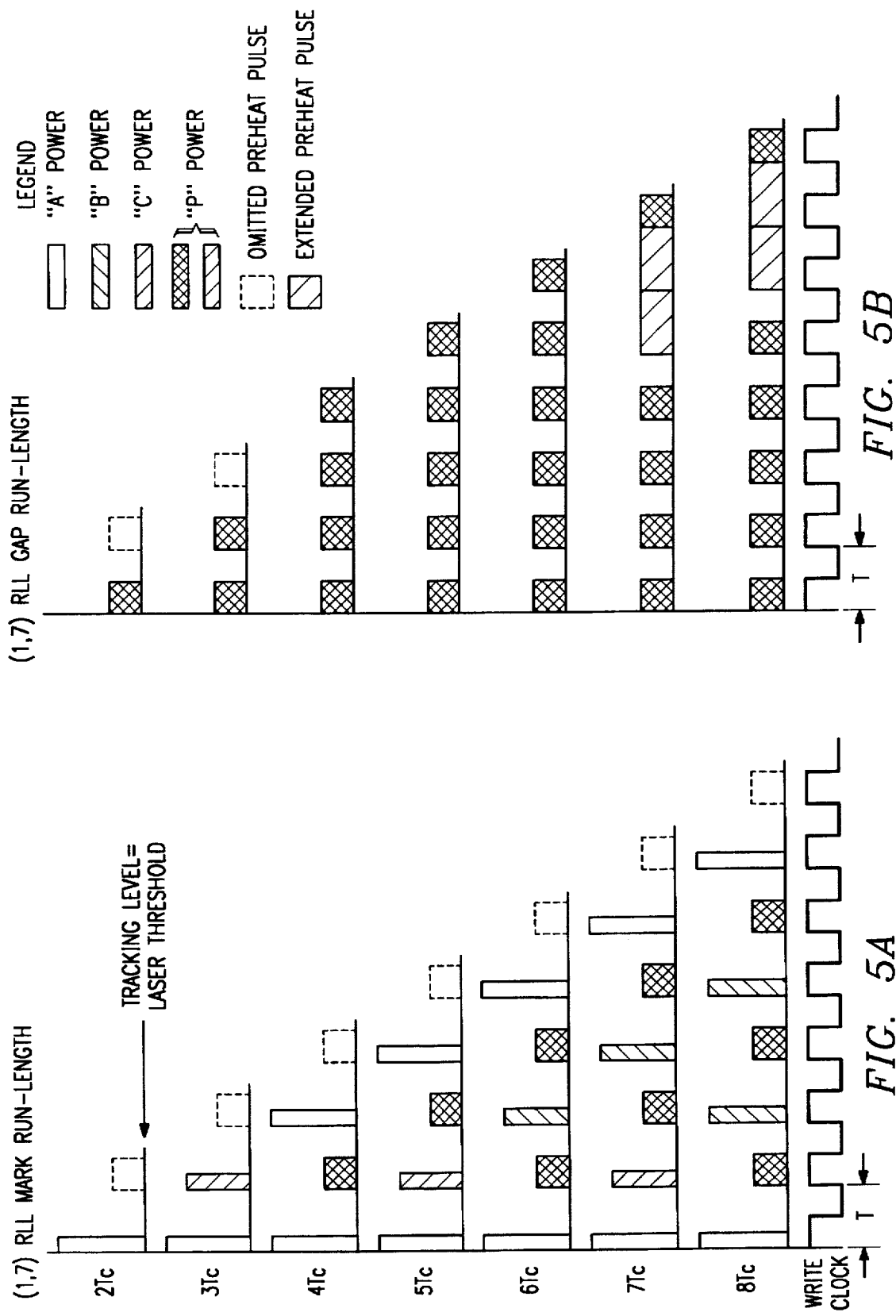
FIGS. 5A and 5B are diagrams of laser beam pulse sequences for mark run lengths and gap run lengths, respectively.

FIGS. 5A–5B show a diagram of the recording pattern (laser irradiation profile) that implements a (1,7) RLL code and that uses preheat pulses between writing pulses and during the gap run-lengths. This profile is intended for use in standard M-O recording systems but is extendable with minor modifications to other optical recording systems such as those that use WORM, DOW M-O and MSR media. The code is a set of mark run-lengths (FIG. 5A) and gap run-lengths (FIG. 5B) of 2T to 8T. The laser can be pulsed to any of four discrete power levels above the threshold level (these power levels are designated as A, B, C, or P in FIGS. 5A–5B), where A, is greater than B, is greater than C, is greater than P. During the periods of writing when the laser is not at the A, B, C, or P power level, it is operating at "tracking" power level which is as low as possible. Laser pulses at power level A, B, and C are of sufficient intensity to produce substantially circular marks in the optical disk during laser irradiation and as such are referred to as writing pulses. Laser pulses at power level P are not of sufficient intensity to produce marks in the optical disk and as such are referred to as preheat pulses since they serve only to locally heat the disk. In optical disk drives, the time duration of the writing pulse is as short as possible and typically around 10–20 ns. It is usually selected to be between approximately 30% of T at the disk inner-most track and 60% of T at the disk outer most track. Both the number and duty cycle of the preheat pulses is variable. The duty cycle spans the range between 0% and 100% of T. As an example, the P pulse width is selectable among discrete values of 0%, 50%, and 100% of T to simplify the circuitry needed to modulate the laser. These discrete values of P pulse width provide sufficient flexibility in preheat to ensure adequate edge placement regardless of the particular gap run length.

As shown in FIG. 5A for the case of a (1,7) RLL code, mark run-lengths are formed by either an isolated A laser pulse in the case of a 2T mark run-length or the combination of an A laser pulse with A, B, C, and/or P pulses in the case of longer mark run lengths. The laser power level A is adjusted so that the 2T mark is the correct length. As is known in conventional disk drives, this is done during the drive's laser power calibration routine by writing a predetermined data pattern and then measuring the read-back signal amplitude by one of several known techniques. The calibration is typically performed at disk drive start-up and/or at periodic intervals during drive operation.

Mark run-lengths>2T require at least two laser pulses: an A laser pulse to form the leading edge submark and either a C pulse (in the case of mark run-lengths greater than 4T) to form the trailing edge submark. The power level C is adjusted so that the 3T mark is the correct length. This C pulse is required because thermal preheating of the optical disk by the preceding A pulse would otherwise cause the trailing edge submark of the 3T mark run-length to be positioned beyond its desired precise location on the disk. The pulses used to write leading and trailing edge submarks are called "edge" writing pulses. Each of the edge writing pulses forms a substantially circular submark of length 2L on the optical disk. Whenever the mark run-length is greater than 4T (i.e., the length of two contiguous submarks formed by successive leading and trailing edge writing pulses), additional write pulses are required. These additional pulses are called "filler" writing pulses as described in the '313 patent.

The preheat pulses shown in FIGS. 5A–5B serve two purposes. First, when writing mark run-lengths (FIG. 5A) they increase the ambient temperature of the optical disk, which reduces the power required in the A, B, and C writing pulses. This is accomplished by applying preheat pulses on all write clocks which do not have a writing pulse, i.e. during all clocks of a gap run-length and during clocks of a mark run-length which do not have an A, B, or C writing pulse. The laser power is applied only on clocks where no writing pulse occurs and then as discrete preheat pulses of length 0.5T at the P power level, which is set at the minimum level required to provide adequate preheating, i.e., approximately 2 mw.

The second purpose served by the preheat pulses is that during the gap run-length (FIG. 5B) they control the ambient temperature of the optical disk during the subsequent leading edge writing pulse of a mark run-length. This control is required to compensate for the effect of preheating of the optical disk by the immediately preceding trailing edge writing pulse. This is accomplished by varying the amount of preheat (duty cycle of the preheat pulses) applied in each gap run-length as shown in FIG. 5B. First, preheat pulses are omitted during the last write clock in all mark run-lengths (see dashed "pulses" representing omitted preheat pulses in FIG. 5A). This allows the optical disk to rapidly cool after the trailing edge writing pulse. Second, as shown in FIG. 5B, preheat pulses are either omitted (0% duty cycle) as in the case of 2T and 3T gap run-lengths or extended (100% duty cycle) as in the case of 7T and 8T gap run-lengths. This ability to vary the duty cycle of the preheat pulses allows tailoring of the preheating to each gap run-length to ensure that the subsequent leading edge writing pulse forms the leading edge submark at the proper precise position on the optical disk. The specific preheat pulse patterns shown in FIGS. 5A–5B represent patterns that are appropriate for most current M-O media. The exact number and placement of added or deleted preheat pulses is adjusted for a particular media to ensure accurate mark and gap run-lengths.

As discussed above, the complexities of writing PWM waveforms combined with evolving media characteristics and the need to allow recording of data using PPM signals require a flexible writing system to write consistent and repeatable data on optical media. The writing system illustrated in FIG. 6 comprises a writing system that provides the optical laser a power pulse of programmable power level and of programmable duration.

Figure 6:
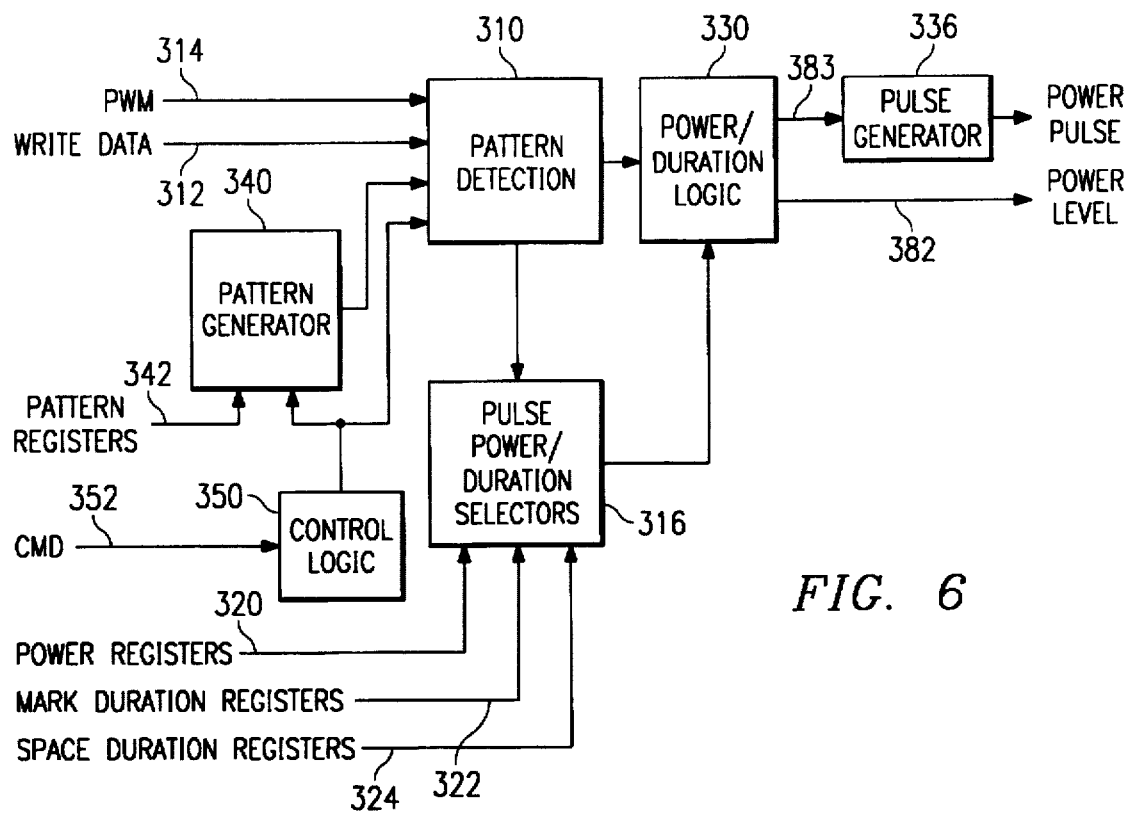
FIG. 6 is a block diagram of a writing system in accordance with the present invention.

The writing system of FIG. 6 comprises pattern detection logic 310 to detect input data 312 for write code patterns and whether the PWM indicator 314 is set. The pattern detection data is used by pulse power/duration selector 316 to select the write codes from programmable power registers 320, programmable mark duration registers 322 and programmable space duration registers 324. The selected patterns are employed in power/duration logic 330 to shift detected pulse power and pulse duration data to set the laser power level and turn on and off the pulse generator 336 to be delivered to the laser driver circuits 254 in FIG. 1.

Pattern generator 340 provides programmed patterns 342 for write power calibration and testing. Control logic 350 comprises a state machine to interpret system commands 352.

Controller 240 in FIG. 1 or the host processor programs the patterns, laser power and mark and space durations in registers 342, 320, 322 and 324, respectively, and indicates on line 314 whether the recording is to be PWM or PPM. The state of the writing system is set by control logic 350 in response to a command on line 352.

Figure 7:
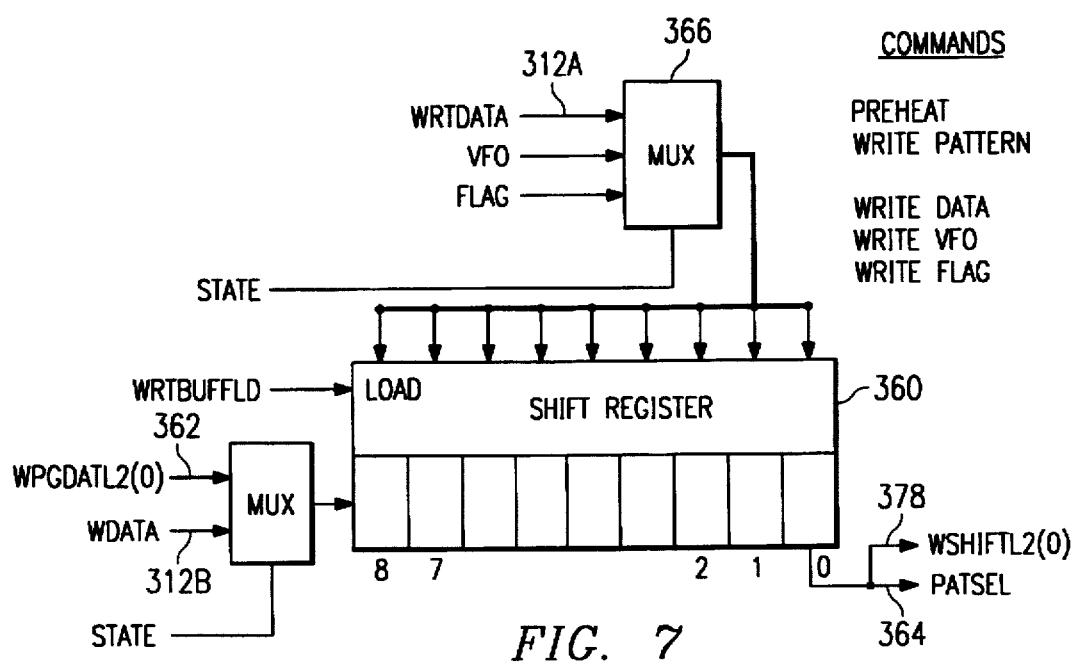
FIG. 7 is a schematic diagram of a pattern detector of the writing system of FIG. 6.

Referring to FIGS. 6 and 7, once commanded to write data on line 352, pattern detection logic 310 receives the data on line 312 in FIG. 6. The data as shown in FIG. 7 is received as a parallel or serial bit stream on line 312A or 312B, respectively, representing, for example, a (1,7) or (2,7) code and shifts it through a shift register 360. Shift register 360 is of appropriate size to contain the largest legal code to be written, e. g., 9 bits. In a K-1 RLL code, shift register 360 must be of sufficient size to contain K "zeros" and a "one" at each end, here 7 "zeros" and 2 "ones". Register 360 may be loaded serially from either a conventional optical formatter on line 312 or from pattern generator 340 on line 362.

Shift register 360 may also be parallel loaded at multiplexer 366 to program special signals such as VFO and Flag, as are known to those of ordinary skill in the art.

Upon a binary "1" reaching the end of the register 360 (bit position 0), the pattern is detected and a load pulse (patsel) is generated on line 364.

Figure 8:
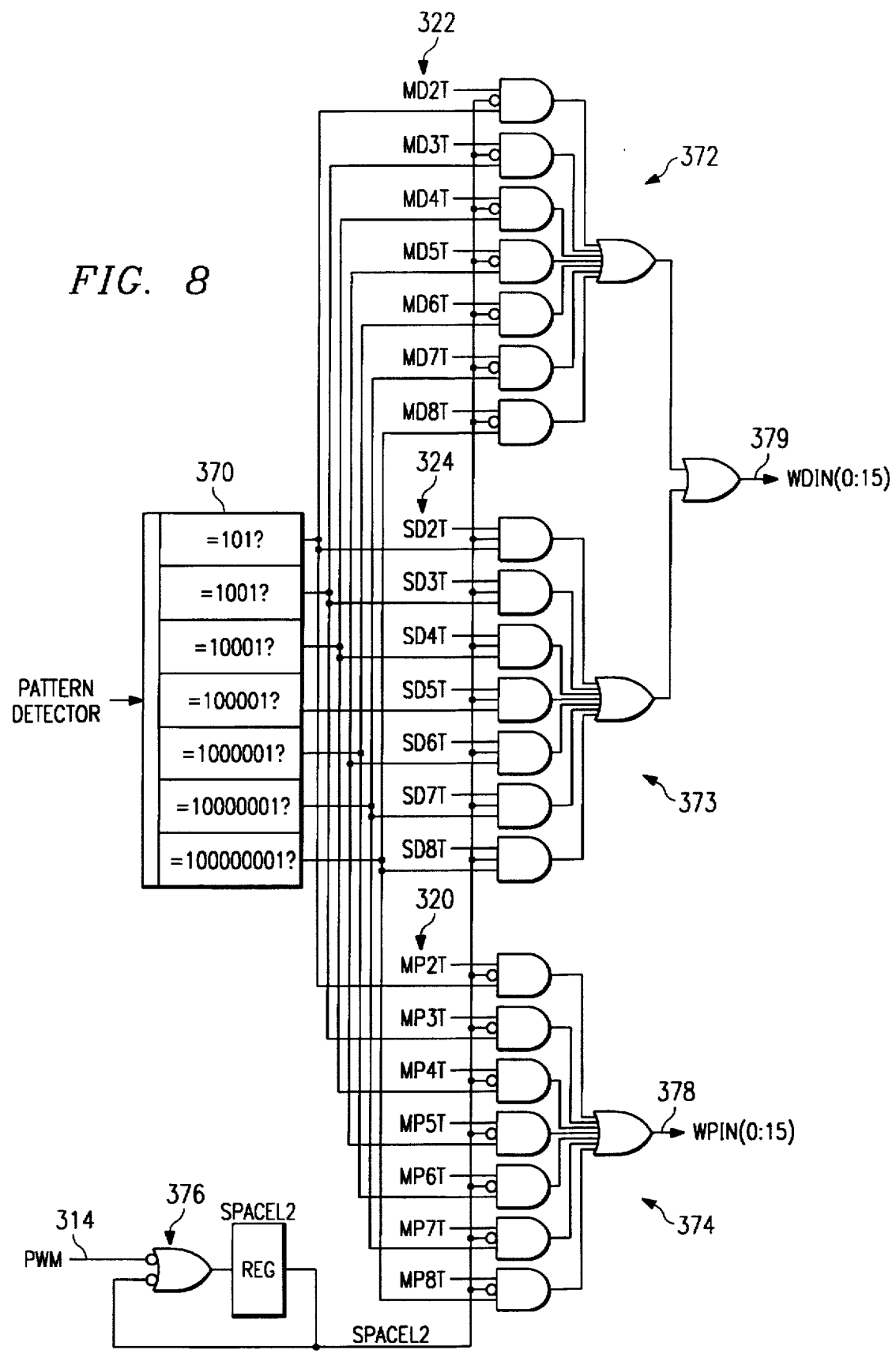
FIG. 8 is a schematic diagram of a power/duration selector of the writing system of FIG. 6.

FIG. 8 illustrates an embodiment of pulse power/duration selector 316 of FIG. 6. The output of register 360 of FIG. 7 is provided to pattern comparators 370 of FIG. 8 which selects the comparator corresponding to the provided pattern. Gates 372 select the corresponding mark duration pattern stored in the corresponding one of mark duration registers 322, gates 373 select the corresponding space duration pattern stored in the corresponding one of space duration registers 324, and gates 374 select the corresponding mark power pattern stored in the corresponding one of mark power registers 320. The space power level may be 0 as per the '313 patent, or may be set to the preheat power level as described in the '656 patent. In either case, the space power level is a constant and therefore, no space power level gates or registers need be provided. The provision of power levels for spaces is, however, contemplated by the present invention as an alternative embodiment. Alternatively, the space or gap power levels may be set by control logic 350 in FIG. 6 to a "preheat" state, as shown in FIG. 7.

Referring to FIGS. 6 and 8, registers 320 and 322 are programmed to provide the mark power and mark duration pattern signals as outlined above with respect to FIGS. 4 and 5. Other suitable mark power and duration patterns may be used and programmed into the registers. Space duration patterns as outlined with respect to FIG. 6 are programmed into registers 324. Four power levels and four durations may be provided for each submark or time period T, and is represented by a pair of binary bits. The total mark pulse or gap length is represented in the registers 320, 322 and 324 by a series of the pairs of binary bits, each pair of bits representing each time period T.

Circuit 376 responds to the PWM signal 314 to toggle on and off with each load output from register 360 of FIG. 7 as supplied on line 378. When "on", circuit 376 enables mark duration gates 372 and mark power level gates 374; and when "off", circuit 376 enables space duration gates 373. In this manner, the PWM output toggles between the mark outputs of FIG. 5A and the gap outputs of FIG. 5B.

When in PPM mode, circuit 376 is "off", and only the programmed mark power and duration gates 372 and 374 are enabled. Registers 320 and 322 are programmed with the appropriate signal levels and durations for implementing the PPM outputs, which may include the preheat power levels, above.

The power level output signal string from the selected one of registers 320 is provided in parallel on lines 378, and the duration signal string from the selected one of registers 322 or 324 is provided in parallel on lines 379.

Figure 9:
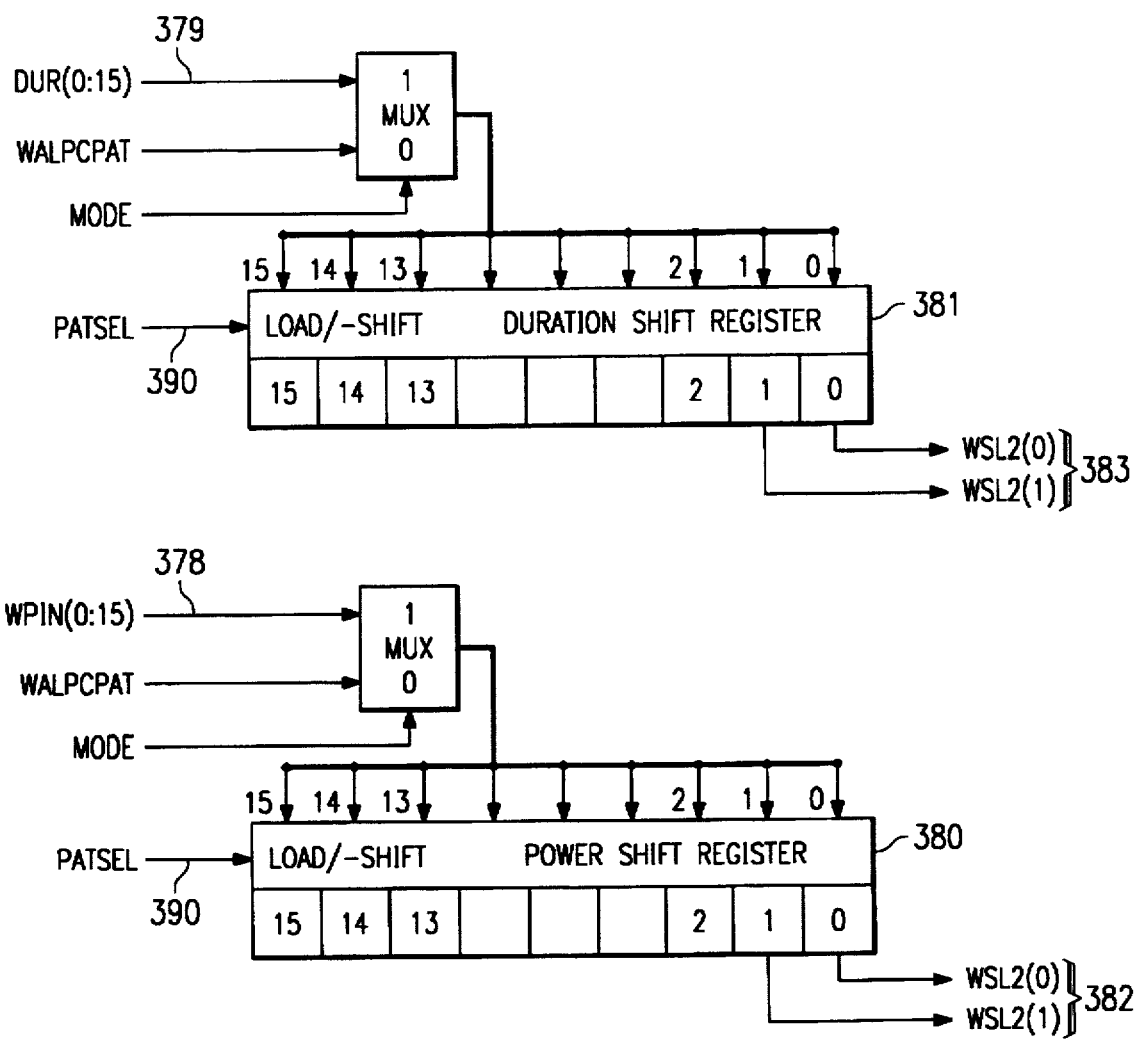
FIG. 9 is a schematic diagram of a power/duration logic of the writing system of FIG. 6.

FIG. 9 illustrates the power/duration logic 330 of FIG. 6. Power shift register 380 parallel loads the power level output signal of lines 378, and duration shift register 381 parallel loads the duration output signal of lines 379. The registers 380 and 381 are shifted by 2 each channel clock cycle until their data is depleted. The 2 bit at a time outputs are provided on lines 382 and 383, respectively. As the last bit is being shifted out, line 390 is pulsed to allow a new value to be loaded into each register. The signal on line 390 is derived from output 364 in FIG. 7.

Referring to FIG. 6, the duration output on lines 383 are provided to pulse generator 336, which provides a slight delay, allowing the power level output on lines 382, which are directly provided to the laser driver, to arrive slightly ahead of the output from pulse generator 336. This delay allows the laser driver 254 (FIG. 1) to set the power level before the power pulse arrives. Pulse generator 336 or the laser driver may be calibrated to provide optimal laser pulse amplitudes and durations for each of the provided power level and duration outputs from logic 330. The calibration thereof forms no part of the present invention.

Referring additionally to FIG. 7, control logic 350 contains sequential logic that receives commands 352 instructing the write system the modes in which to operate. Possible commands include normal write, sector erase, flag field write, and programmable pattern generation mode.

Figure 10:
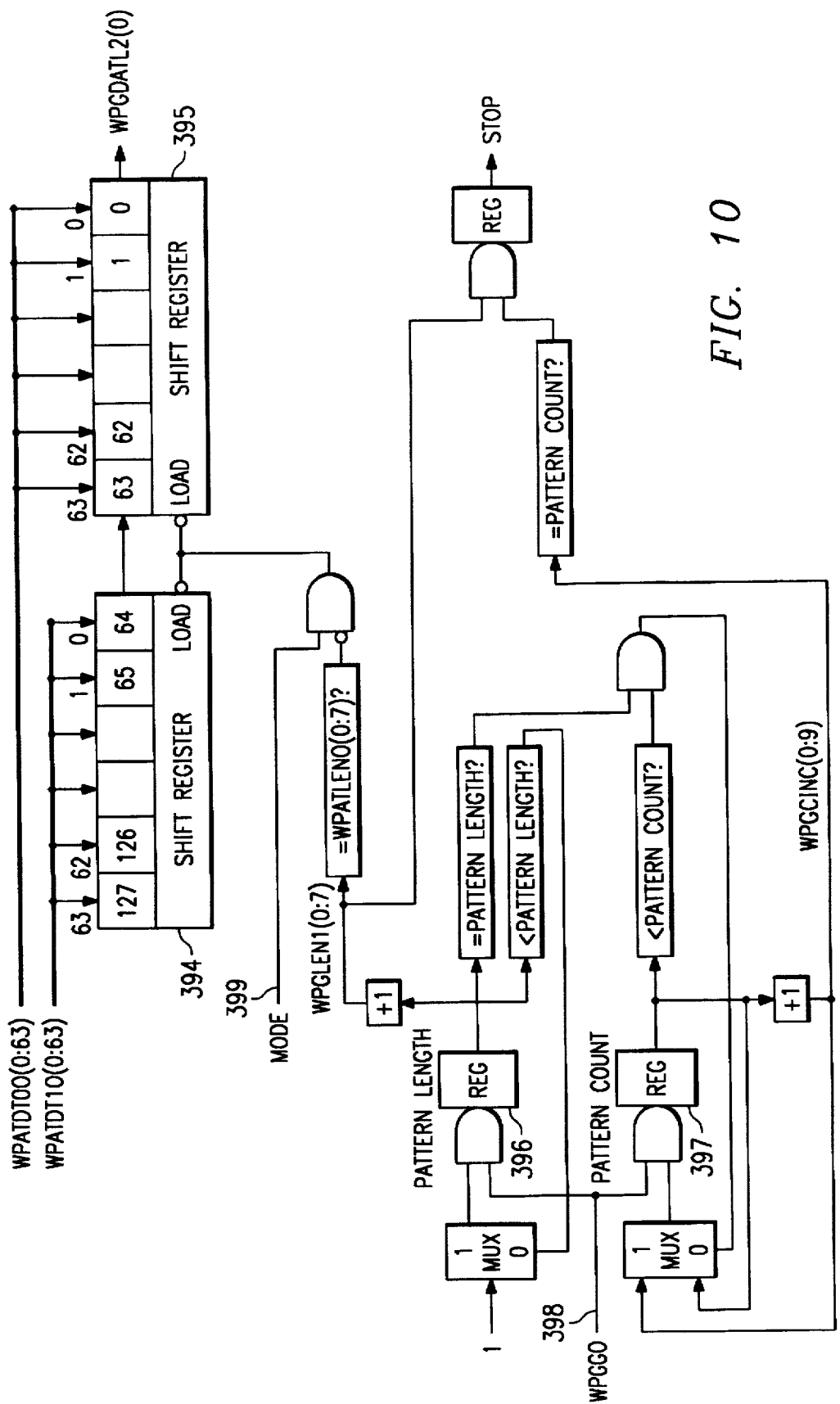
FIG. 10 is a schematic diagram of a programmable pattern generator of the writing system of FIG. 6.

FIG. 10 comprises pattern generator 340 of FIG. 6. The pattern generator serially loads a pattern of programmable length from registers 394 and 395 to the pattern detector 310. The pattern may be repeated under program control resulting in a system that can fill sectors with consistent test data for system test or calibration. Operation is begun by programming all or part of the pattern registers 394 and 395 with the pattern to be written. Then a pattern length register 396 must be programmed with the number of bits to shift from the pattern generator and a repeat count is programmed in register 397 to specify how many times the pattern will be shifted before the operation completes. Lastly, a command is sent to the write system instructing it to begin the operation, at line 398.

Two modes of operation may be specified at line 399. One mode without a signal on line 399 will run the pattern until the repeat count is exhausted, and the other designated from line 399 will repeat the pattern until another command is sent to shut it down.

While the preferred embodiments of the present invention have been illustrated in detail, it should be apparent that modifications and adaptations to those embodiments may occur to one skilled in the art without departing from the scope of the present invention as set forth in the following claims.

We claim:

1. A pulse position modulation (PPM) and pulse width modulation (PWM) pulse generation circuit responsive to a PPM/PWM mode command and input data for generating pulse signals comprising:

a pattern detector responsive to said PPM/PWM mode command for detecting said input data and providing detected data signals;

a plurality of programmable pattern registers for storing programmed pulse power and duration pattern write codes;

a pulse selector responsive to said detected data signals for selecting said programmed pulse power and duration pattern write codes from said programmable pattern registers, said pulse selector responsive to said PPM mode to select a single mark pulse-power and a single mark duration pattern write code from said programmable pattern registers for said detected data signals, and responsive to said PWM mode to select a sequence of at least one said pulse power and duration pattern write codes from said programmable pattern registers for alternate ones of said detected data signals, whereby said alternate PWM sequences comprise mark signals; and a pulse generator responsive to said power pattern write codes to set pulse power levels and to said duration pattern write codes to set the duration of said generated pulse signals.

2. The PPM/PWM pulse generation circuit of claim 1, wherein:

said programmable pattern registers additionally store space duration pattern write codes;

said pulse selector additionally responds to said PWM mode by selecting at least one space duration pattern write code from said programmable pattern registers for alternate ones of said detected data signals, whereby said space signals alternate with said mark signals.

3. The PPM/PWM pulse generation circuit of claim 2, wherein:

said pattern detector responds to said PWM mode by providing a toggle signal with each said detected data signal; and said pulse selector responds to said PWM mode and said toggle signal to alternate between providing said mark pulse power and duration pattern write codes and providing said space duration pattern write codes from said programmable pattern registers to thereby provide said alternating mark and space signals.

4. The PPM/PWM pulse generation circuit of claim 2, wherein:

said pulse generator provides in said PWM mode at least two said mark power levels.

5. The PPM/PWM pulse generation circuit of claim 4, wherein:

said pulse generator provides in said PWM mode at least two said mark durations.

6. The PPM/PWM pulse generation circuit of claim 2, wherein said pattern detector comprises:

a parallel loadable shift register shifting in serially provided input data and parallel loading special patterns.

7. The PPM/PWM pulse generation circuit of claim 3, wherein:

said pattern detector comprises a shift register arranged to serially load said input data from one end thereof until a "1" bit is sensed at the other end thereof, and upon sensing said "1" bit, to provide said toggle signal and said detected data signal.

8. The PPM/PWM pulse generation circuit of claim 1, for generating mark power and duration signals and space duration signals, wherein:

said pattern detector provides detected data signals;

said pulse selector is responsive to said detected data signals for selecting programmed mark pulse power and duration pattern write codes and space duration pattern write codes; and said pulse generator is responsive to said mark pulse power pattern write codes to set mark pulse power levels and to said mark duration pattern write codes to set the duration of said generated mark pulse signals, and responsive to said space duration pattern write codes to set space duration.

9. An optical disk drive for recording pulse position modulation and pulse width modulation data on an optical disk in response to a PPM/PWM mode command and input data, comprising:

a laser for generating a light beam directed to tracks on said optical disk to heat a data layer thereof;

a motor for rotating said disk relative to said light beam;

a pattern detector responsive to said PPM/PWM mode command for detecting said input data and providing detected data signals;

a plurality of programmable pattern registers for storing programmed pulse power and duration pattern write codes;

a pulse selector responsive to said detected data signals for selecting said programmed pulse power and duration pattern write codes from said programmable pattern registers, said pulse selector responsive to said PPM mode to select a single mark pulse power and a single mark duration pattern write code from said programmable pattern registers for said detected data signals, and responsive to said PWM mode to select a sequence of at least one said pulse power and duration pattern write codes from said programmable pattern registers for alternate ones of said detected data signals, whereby said alternate PWM sequences comprise mark signals;

a pulse generator responsive to said power pattern write codes to set pulse power levels and to said duration pattern write codes to set the duration of said generated pulse signals; and a laser driver connected to said pulse generator and to said laser for pulsing said laser at said set pulse power levels for said set duration.

* * * * *